(12) United States Patent
Van Andel et al.

(10) Patent No.: US 7,963,067 B2
(45) Date of Patent: Jun. 21, 2011

(54) HEAT EXCHANGER AND APPLICATIONS THEREOF

(75) Inventors: Eleonoor Van Andel, Enschede (NL); Europeo Eleonoor Van Andel, Almelo (NL)

(73) Assignee: Fiwihex B.V., Almelo (NL)

(*) Notice: Subject to any disclaimer, the term of this patent is extended or adjusted under 35 U.S.C. 154(b) by 512 days.

(21) Appl. No.: 11/887,490

(22) PCT Filed: Apr. 3, 2006

(86) PCT No.: PCT/NL2006/050071
§ 371 (c)(1), (2), (4) Date: Sep. 28, 2007

(87) PCT Pub. No.: WO2006/104390
PCT Pub. Date: Oct. 5, 2006

(65) Prior Publication Data
US 2008/0142197 A1    Jun. 19, 2008

(30) Foreign Application Priority Data
Apr. 1, 2005 (EP) .................................... 05075766

(51) Int. Cl.
*A01G 9/24* (2006.01)
(52) U.S. Cl. .............................................. 47/17; 165/47
(58) Field of Classification Search ........ 47/17; 62/260, 62/406, 426; 165/47, 171, 176
See application file for complete search history.

(56) References Cited

U.S. PATENT DOCUMENTS

| | | | | |
|---|---|---|---|---|
| 46,596 A * | 2/1865 | Somes | ............................. | 62/89 |
| 2,268,680 A | 1/1942 | Von Linde | | |
| 2,469,635 A * | 5/1949 | Dalin et al. | .................... | 122/1 R |
| 2,620,170 A * | 12/1952 | Brickman | ...................... | 165/171 |
| 2,667,762 A * | 2/1954 | Hornaday | ....................... | 62/456 |
| 2,705,877 A * | 4/1955 | King | ............................. | 165/53 |
| 2,706,105 A * | 4/1955 | Young | ............................ | 165/53 |
| 3,368,617 A * | 2/1968 | Malek et al. | .................. | 165/175 |
| 3,450,194 A | 6/1969 | Barthel | | |
| 3,559,728 A | 2/1971 | Lyman | | |
| 3,788,388 A | 1/1974 | Barkmann | | |
| 3,807,493 A | 4/1974 | Stewart | | |
| 4,027,998 A | 6/1977 | Schwartz | | |
| 4,166,339 A * | 9/1979 | Heller et al. | ..................... | 47/17 |
| 4,258,780 A * | 3/1981 | Suo | ............................... | 165/45 |
| 4,449,579 A | 5/1984 | Miyazaki et al. | | |

(Continued)

FOREIGN PATENT DOCUMENTS
DE    2138376 A1    2/1973
(Continued)

*Primary Examiner* — Rob Swiatek
*Assistant Examiner* — Kristen C Hayes
(74) *Attorney, Agent, or Firm* — The Webb Law Firm

(57) ABSTRACT

A heat exchanger for exchanging heat between a liquid-containing medium and a gas comprises a medium inlet and a medium outlet and a flat heat exchanger mat, wherein the mat comprises a number of parallel, equidistant capillaries of heat-conducting material and wires of heat-conducting material which are attached in heat-conducting contact to the capillaries, extend in transverse direction relative thereto and have a mutual distance in the order of magnitude of the diameter of the wires, wherein gas can flow along the wires for heat exchange between this gas and the medium flowing through the capillaries, and wherein the gas flows along the mat and at least a substantial part of the gas is prevented from flowing through the mat, and the gas flows in longitudinal direction of the wires.

18 Claims, 8 Drawing Sheets

U.S. PATENT DOCUMENTS

| | | | |
|---|---|---|---|
| 4,454,862 A | | 6/1984 | Kamanaka et al. |
| 4,600,050 A | | 7/1986 | Noren |
| 4,706,739 A | | 11/1987 | Noren |
| 4,911,231 A | | 3/1990 | Horne et al. |
| 4,949,218 A | | 8/1990 | Blanchard et al. |
| 4,960,169 A | * | 10/1990 | Granetzke ................... 165/173 |
| 5,035,281 A | | 7/1991 | Neuenfeldt et al. |
| 5,123,483 A | * | 6/1992 | Tokutake et al. ............ 165/176 |
| 5,579,834 A | * | 12/1996 | Chiba .......................... 165/173 |
| 5,603,376 A | | 2/1997 | Hendrix |
| 5,647,431 A | | 7/1997 | Takeshita et al. |
| 5,657,641 A | | 8/1997 | Cunningham et al. |
| 5,704,421 A | * | 1/1998 | Takeshita et al. ............ 165/151 |
| 5,718,628 A | | 2/1998 | Nakazato et al. |
| 5,738,166 A | | 4/1998 | Chou |
| 5,765,743 A | | 6/1998 | Sakiura et al. |
| 5,806,585 A | | 9/1998 | Yoshida et al. |
| 5,822,854 A | | 10/1998 | Ikejima et al. |
| 5,832,992 A | | 11/1998 | Van Andel |
| 5,964,284 A | * | 10/1999 | Ikejima et al. ............... 165/171 |
| 6,039,111 A | | 3/2000 | Kawaguchi et al. |
| 6,065,531 A | | 5/2000 | Schneider et al. |
| 6,192,976 B1 | | 2/2001 | Yoshida et al. |
| 6,222,730 B1 | | 4/2001 | Korvenheimo et al. |
| 6,538,883 B1 | | 3/2003 | Greer |
| 6,543,529 B2 | * | 4/2003 | Ohgaki ......................... 165/171 |
| 6,575,230 B1 | | 6/2003 | Kadota et al. |
| 6,651,452 B2 | | 11/2003 | Lecke et al. |
| 6,671,212 B2 | | 12/2003 | Macri et al. |
| 6,705,043 B1 | * | 3/2004 | Opdam et al. .................. 47/17 |
| 6,742,583 B2 | | 6/2004 | Tikka |
| 6,789,612 B1 | | 9/2004 | Okamoto et al. |
| 6,804,114 B1 | | 10/2004 | Greer |
| 6,896,612 B1 | | 5/2005 | Novotny |
| 7,089,998 B2 | | 8/2006 | Crook |
| 7,100,682 B2 | | 9/2006 | Okamoto et al. |
| 7,367,384 B2 | | 5/2008 | Madara et al. |
| 7,385,810 B2 | | 6/2008 | Chu et al. |
| 7,534,167 B2 | | 5/2009 | Day |
| 7,571,760 B2 | | 8/2009 | Lee et al. |
| 7,588,028 B2 | * | 9/2009 | Scott ............................... 126/77 |
| 2002/0173266 A1 | | 11/2002 | Sharp et al. |
| 2005/0005528 A1 | | 1/2005 | Brault et al. |
| 2007/0151718 A1 | * | 7/2007 | Youn et al. .................. 165/171 |
| 2009/0296346 A1 | | 12/2009 | Van Andel |

FOREIGN PATENT DOCUMENTS

| | | |
|---|---|---|
| DE | 8433131 | 4/1985 |
| DE | 196 06 727 | 8/1997 |
| DE | 198 06 207 | 8/1999 |
| DE | 19831918 A1 | 1/2000 |
| EP | 0 469 563 | 2/1992 |
| EP | 0 735 328 | 10/1996 |
| EP | 0 864 835 | 9/1998 |
| GB | 620291 | 3/1949 |
| JP | 57-052729 | 3/1982 |
| JP | 61-153388 | 7/1986 |
| JP | 04-316930 | 11/1992 |
| JP | 09-004867 | 1/1997 |
| JP | 2003161587 A | 6/2003 |
| JP | 2004018284 A | 1/2004 |
| NL | 9301439 | 3/1995 |
| NL | 1012114 | 11/2000 |
| WO | WO 95/05570 | 2/1995 |
| WO | 2006135239 A3 | 12/2006 |

* cited by examiner

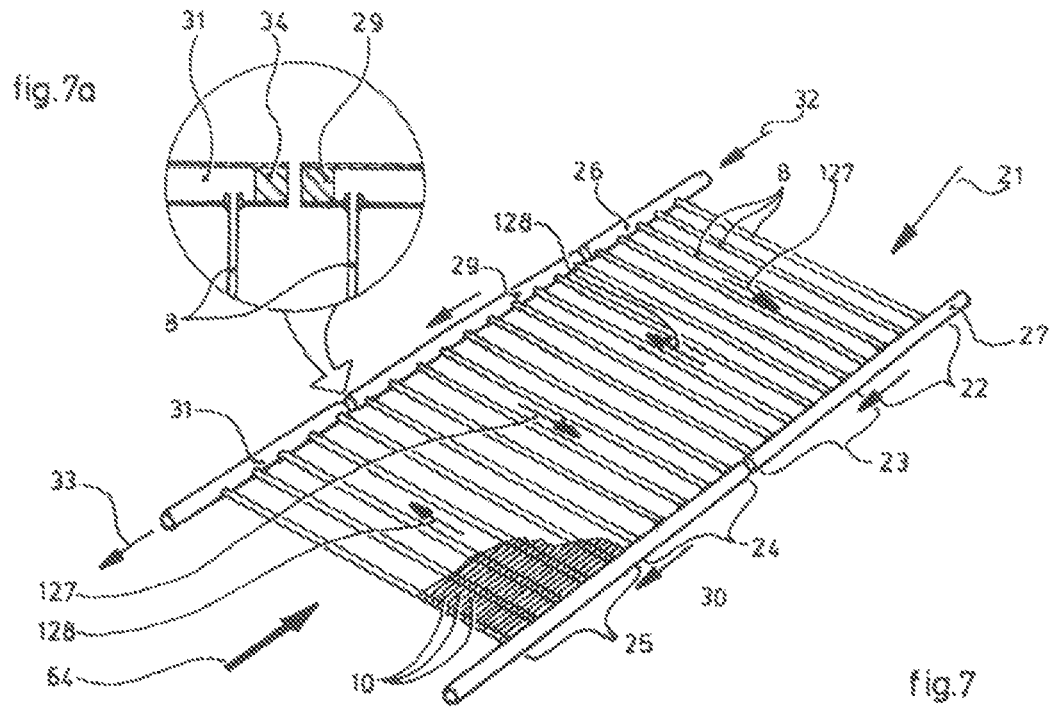
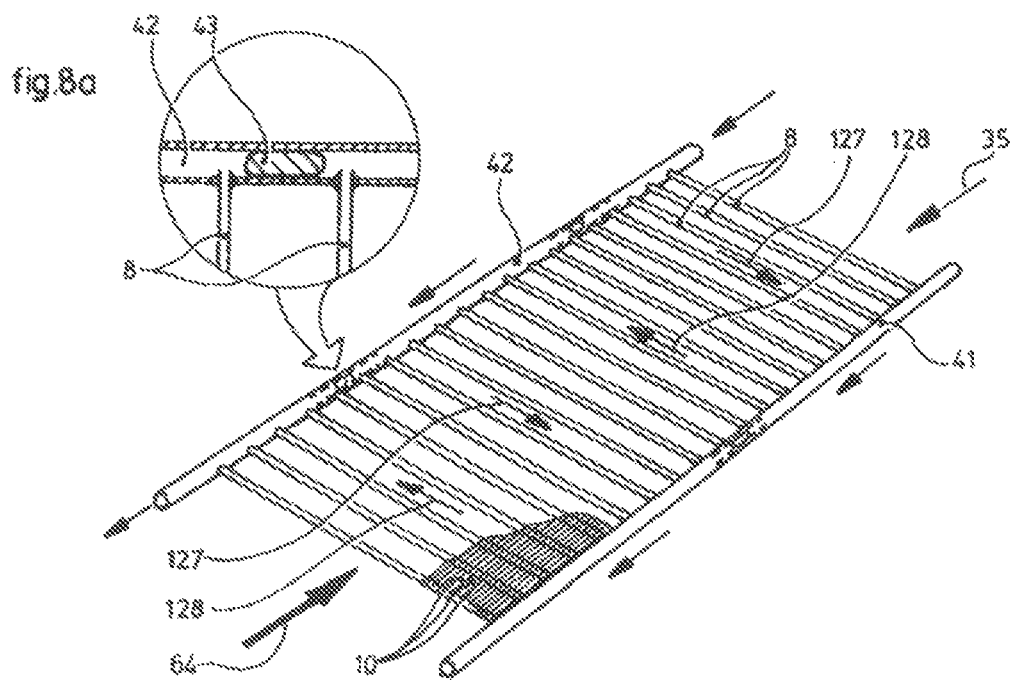

HEAT EXCHANGER AND APPLICATIONS THEREOF

BACKGROUND OF THE INVENTION

1. Field of the Invention

The invention relates to a heat exchanger for exchanging heat between a liquid-containing medium or a liquid-vapor mixture, and a gas.

2. Description of Related Art

Such a heat exchanger is known for instance from JP-A-61-153388 (Kokai) and from EP-A-0 735 328.

In the heat exchangers known from these publications the gas flows through the openings of the mat formed by the capillaries and the wires. As a result the gas flowing through the heat exchanger undergoes a considerable flow resistance. This flow resistance must be overcome by guiding the gas flow through the heat exchanger under the influence of a fan means. The electric power required for this purpose results in an undesirable effective reduction in the performance of the heat exchanger.

In the known heat exchangers it is in addition not possible to prevent dust accumulating in the mats within a very short time. The heat exchanger hereby becomes blocked in a very short time. The design performance can be temporarily restored again only by maintenance or blowback of gas, and thus cleaning of the mat.

It is an object of the invention to greatly improve the performance of the heat exchanger of the described type and to make the heat exchanger substantially maintenance-free.

With a view hereto the invention provides a heat exchanger of the described type which has the feature of claim 1.

SUMMARY OF THE INVENTION

One embodiment of the invention provides a heat exchanger having a housing with a gas inlet and a gas outlet for exchanging heat between either a liquid-containing medium or a liquid-vapor mixture, and a gas. This embodiment of the heat exchanger also comprises a medium inlet, a medium outlet, and at least one substantially flat heat exchanger mat. The heat exchanger mat includes a plurality of capillaries of heat-conducting material disposed in mutually parallel and mutually equidistant relation and a plurality of wires of heat-conducting material. The wires are attached in heat-conducting contact to the capillaries, extend in mutually equidistant relation in a transverse direction relative to the capillaries and have a mutual distance between each wire in the order of magnitude of the diameter of the wires. Under the influence of a drive means, the gas can flow along the wires for heat exchange between the gas and the medium flowing through the capillaries via the walls of the capillaries and the wires. The heat exchanger is embodied such that the gas flows in a longitudinal direction of the wires along each mat and that at least a substantial part of the gas is prevented from flowing through the mat.

Another possible embodiment of the heat exchanger includes an inlet manifold and an outlet manifold with the capillaries extending between the inlet and outlet manifolds so that medium can flow therethrough. Additionally, the wires could be connected to the capillaries by means of a weaving process. The wires could also be attached to the capillaries in mutually parallel relation on either side of the capillaries, as opposed to a weaving process. In such a case, an advantage is gained because the center-to-center distance between the capillaries can be considerable smaller, which improves the performance of the heat exchanger still further. For the weaving process, the center-to-center distance of the capillaries is about 10 mm+/−40%. For attaching the wires in the mutually parallel relation, the center-to-center distance of the capillaries is about the 4-16 mm.

A further embodiment of the heat exchanger provides the inlet manifold with at least one interruption or plug and provides the outlet manifold with at least one interruption or plug placed offset relative thereto such that the medium admitted through the inlet of the inlet manifold is guided successively through a first inlet manifold, the group of capillaries connecting thereto, a first intermediate manifold, a second group of capillaries and so forth. Finally, through the outlet manifold such that the medium moves in the one direction in zigzag manner in a group of capillaries and the following group of capillaries moves in opposite direction.

The inlet manifold can also form part of the outlet manifold of a preceding group of capillaries, while the outlet manifold can form part of an inlet manifold of a following group of capillaries. It will be apparent that the relevant aligned manifolds must be thermally separated from each other, because there is temperature difference between the two during operation.

In yet another embodiment, the capillaries are formed from one capillary tube modeled into a zigzag shape with each end of each capillary being connected via a U-shaped curved part to the end of a nearby capillary. The end zones of the capillary tube are connected to their respective tubes and act as manifolds. Also, the U-shaped curved parts of both sides of the mat could be in register and coupled mechanically to each other by means of a strengthening profile with a low heat conduction due to the zigzag modelled capillary tube having a very limited mechanical stiffness. In certain embodiments, a number of heat exchanger mats can be used and held by spacers in mutually parallel and equidistant relation. In such a case, the spaces could be mutually abutting profiles. An air duct wall can also be dimensioned in which slits hold the U-bends of the capillaries in their position.

The capillaries are connected in series to each other, no use is made of an inlet manifold and an outlet manifold and the medium in adjacent capillaries flows in mutually opposite directions. This embodiment provides a greater flow resistance to the through-flowing medium than for instance the latter embodiment discussed above, but has the advantage of being able to suffice with a very small volume of medium. Particularly in the case where this medium has harmful or hazardous properties, such as CFCs for air-conditioning systems, propane and the like, the quantity of medium in a heat exchanger, even if it comprises a plurality of mats, can be negligible and amount to for instance only a few tens of milliliters. In the embodiment where use is made of manifolds, the quantity of medium present in the heat exchanger is substantially greater, for instance in the order of liters. It is conceivable that such a heat exchanger does not even meet the requirements.

In another embodiment, each manifold is a tube having a row of perforations with the ends of the capillaries sealingly inserted into the perforations. The perforations can be arranged in any suitable manner in the relevant tube. The perforations can be made by drilling, piercing with a punch or the like, or flow drilling. Instead of a tube, the air duct wall can also be provided with slit-like holes not extending through the wall, for instance by vacuum-forming or injection moulding, into which the U-bends fit so that the mats become stiff and have mutually equal interspacing.

In certain embodiments, the tubes consist of metal, for instance tin-plated copper, and the capillaries are connected to each tube by soft-soldering at a temperature of about 300°

C. or hard-soldering at a temperature of about 500 to 800° C. A very strong connection is hereby obtained in very simple and per se known manner which can withstand the high pressures in the order of 15-20 bar which occur in compressor coolers and air-conditioning systems.

In some embodiments, each capillary is made of tin-plated copper and the ends of each capillary are stripped of tin prior to the hard-soldering. One way of stripping the tin involves using an anodic treatment in an aqueous solution of NaOH or HCl. Other possible tin-stripping methods can also be considered. Said anodic treatments can however be performed very simply, rapidly and reliably.

In yet a further embodiment suited for applications with limited requirements regarding pressure resistance and complete sealing, each manifold is a tube of thermoplastic material, for instance PP, PE, ABS or EPDM, a cut is made in longitudinal direction on one side of the tube, the ends of the capillaries are placed in the cut, and the material of the tube is then melted at that position by local heating such that the capillaries are connected substantially sealing the tube.

In certain embodiments, the capillaries each have an outer diameter of about 1.8 mm+/−30% and a wall thickness of about 0.4 mm+/−40% and the wires have a diameter of 0.12 mm+/−50%.

Tin-plated copper wires are particularly envisaged. Copper is a material with a high coefficient of heat conduction. In this sense silver wires would be even better, but silver has a drawback of being considerably more expensive. Aluminium could also be suitable for the heat-conducting wires. Aluminium has the drawback however of having a heat conduction coefficient which, while being good, is still lower than that of copper. In addition, it is difficult to connect aluminium wires in reliable manner and in metallic contact to the capillaries in heat conductive manner. In the case of tin-plated copper this can be easily realized with a soldering process. During the production process a mat having capillaries and wires of tin-plated copper can thus be heated to above the melting point of the tin. The adhesion at the contact zones is hereby brought about by soldering.

In yet another embodiment the heat exchanger can be operated in counter-flow. As is known, counter-flow provides the greatest efficiency, greater than crossflow which is known from, among others, the earlier publications referred to at the beginning of this specification. It must of course be appreciated that there is no counter-flow in the strict sense of the word, but an "effective" counter-flow wherein the capillaries do extend in transverse direction relative to the flow direction of the gas but adjacent capillaries have a difference in temperature corresponding to counter-flow.

Certain embodiments can comprise a number of mutually parallel mats held by spacers in mutually parallel an equidistant relation. It will be apparent that the inlet of each mat must be connected to the inlets of the other mats, for instance by a shared main inlet manifold. The outlets of the mats must be connected to each other by means of a main outlet manifold.

Also, the spacers can be the manifolds. To the extent there are local temperature differences between the manifolds, these must be thermally insulated from each other. The mats and the associated manifolds are however preferably identical and connected in parallel to each other in all respects. There need then be no fear of unintentional heat transfer and thermal insulation between the manifolds is not therefore unnecessary.

The spacers and the manifolds can be held against each other. The mats can for instance be formed into a stack and the spacers are pressed against each other by clamping them.

In some embodiments, a forced drive of the gas flow can be provided by a fan.

Alternatively, the housing can be embodied and disposed such that it serves as chimney driving the gas by natural convection wholly without external energy. The $CO_2$-containing exhaust gases of a combined heat and power plant are often admitted into a greenhouse in order to enhance plant growth. The flow impulse of these gases can be used to support the natural draught through the heat exchanger.

According to the prior art, commercial greenhouses are cooled during sunshine hours by opening windows in the roof. This is effective not only in replacing hot inside air with cooler outer air, but also in providing the plant culture with the possibility of evaporating water by replacing moist inside air by drier outside air. The opening of greenhouse windows does however involve the risk of infection with or by flying insects, and results in the loss of practically all irrigation water that the plants need.

It is possible to keep the windows closed and to cool the greenhouse with water, for instance groundwater. This groundwater is heated in the glasshouse and must be cooled again, for instance at night or in the winter, such that it is possible to store the heat absorbed from the greenhouse when cooling is necessary. For this method of operation a heat pump is normally used, such as in air-conditioning systems, which according to the prior art are equipped with standard heat exchangers having pipe bundles with plate fins through which heat exchanger medium flows and around which air flows. The heat pump can re-cool the groundwater and use the heat to heat the greenhouse at night and in the winter. This saves fuel in the case where the glasshouse is heated during these periods by burning fuel. The fuel savings are small and investment cost high whereby, without additional advantages or government subsidies for saving energy, this method of operation is not economically feasible.

NL-A-93 01439 describes a heat exchanger with thin wires. Such heat exchangers can transfer heat in economic manner from water to air or from air to water, when the difference in temperature amounts to only 3-5° C. What is important is that they do this while making use of an amount of electrical energy amounting to only a few percent of the transferred heat. This means that a heat pump or cooling mechanism is no longer necessary and energy savings are greatly improved. A considerable amount of fuel normally used for heating can be saved in this manner. At the time this was considered a breakthrough in climate control technology.

NL-C-10 12114 describes a heat exchanger with thin wires which comprises a radial fan. This is enclosed by strips or mats of a fabric consisting of thin copper wires as warp and copper capillaries as weft, wherein each wire is soldered to each capillary in the strip or mat. All capillaries are connected to a water inlet manifold and a water outlet manifold, both having the form of toroidal tubes disposed around the fan. According to this known art the air is blown between the strips or mats. This therefore corresponds at least partially with the above described crossflow principle.

In order to cool greenhouses such heat exchangers can be arranged under the layer of plants such that they do not impede the incidence of sunlight on the plants. The cooled air from the heat exchanger must be blown upward in order to break up the inversion of hot air which tends to float on the cold air in the greenhouse. Such heat exchangers have a number of drawbacks however. It is difficult to control the water outlet temperature of a number of such heat exchangers when the heat exchangers are used in combination with each other. It is also difficult to control the water outlet temperature of different capillaries in one heat exchanger. It is however necessary to precisely control the difference in water temperature in order to store the heat from the greenhouse. According to the described prior art each heat exchanger therefore needs its own electronic unit which controls the fan speed such that it is always possible to ensure that the temperature difference between the water inlet and the water outlet has an optimum value. With the circular arrangement of the above described known heat exchanger the inner capillaries are subjected to a greater heat flow from the flow-by air than the capillaries located further to the outside, such that even in one heat exchanger the problem occurs of water flows of different temperatures being mixed with each other.

The above described known heat exchangers require a spiral-shaped housing which converts the radial or tangential outflow of air into an airflow in a direction such that the air displacements in the greenhouse can be controlled. The heat exchanger according to the invention needs only a simple housing, wherein for instance on the inlet side there is disposed a fan which generates an airflow which guides air through a heat exchanger according to the invention. In contrast to the round heat exchangers with spiral casing, these heat exchangers can be given such a narrow form that they can be placed in a long row between the columns supporting the roof of the glasshouse. In this manner they do not take up space which can be used for cultivation.

In a further embodiment of the invention, a greenhouse comprising a ground surface, plants supported by the ground surface by support means such as pots, carrying tables and cultivating gutters and which together form a leaf canopy, and a heating and cooling means with at least one heat exchanger according to one of the embodiments described above. Either one of the gas inlet and the gas outlet is situated above the level of the leaf canopy and the other is situated below the level of the leaf canopy, or both are situated in the leaf canopy. In some embodiments of the greenhouse, a heat storage for temporarily storing surplus heat is provided. For example, the heat storage can be of the stratified type.

In another embodiment of the greenhouse, the heating and cooling means are adapted for connection to an aquifer, i.e. a water-containing permeable stratum.

During the summer water from the aquifer can be used to cool the air in the greenhouse, and the thereby heated water can once again be stored in the aquifer. During the winter the stored heat is once again extracted from the aquifer and used to heat the air in the greenhouse.

In other embodiments, an air treatment plant, in particular in air-conditioning installation, comprise heating and cooling means with at least one heat exchanger described above.

Additionally, the above-described heat exchanger can be used in a city heating system with a number of users and heat exchangers as well as in a heat pump system.

The applications of the heat exchanger are not listed exhaustively in this specification.

There now follows a description with a number of special features of possible applications of the heat exchanger according to certain embodiments of the invention, requirements set in respect of the heat exchanger and the manner in which it can be manufactured.

It is known that closing and keeping closed a greenhouse, and thereby avoiding loss of cooling and supplied carbon dioxide, is very favourable for the plants kept in the greenhouse. It is also possible to dispense with the use of pesticides, irrigation water can be reused, fertilization can take place via the air, and the humidity can be held at a desired high level. All these aspects contribute toward lower production costs for the products to be yielded by the greenhouse, and an increased production.

Research in recent years has shown that a relative humidity of 90%, a $CO_2$ concentration of 1000 ppm, a closed roof and the installing of a cooling capacity of 600 $W/m^2$ are the optimum choices for an advanced greenhouse.

In the summer a considerably greater heat from the air in the greenhouse can be transferred to the ground water, as described in claim 25, than is necessary to heat the greenhouse during cold nights and during the winter season. The maximum temperature of the air in the greenhouse amounts to about 30° C., while the minimum temperature amounts to about 19° C. The objective is therefore to cool, store heat and heat without making use of a heat pump. This cannot be realized using known fin-tube heat exchangers, as has become apparent during tests at Themato of Naaldwijk, the Netherlands, during the years 2003-2004. This objective can however be realized with heat exchangers of the type with thin wires, as demonstrated by extensive tests in Huissen, the Netherlands in the period 2005-2006. The investment in a closed greenhouse is determined by the maximum irradiation in the summer, i.e. about 600-700 $Wm^2$, which energy has to be cooled down with water that is only 10° C. colder than the air. This requires a non-trivial design on the basis of the heat exchanger according to the present invention.

Brief attention is now given to the heat transfer and the removal of condensate in glasshouses.

The Stanton number is the ratio between the coefficient of heat transfer and the product of the heat capacity, the density and the velocity of the air. In the usual fin heat exchangers St has a value of about 0.002, considerably lower therefore than the Fanning Friction Factor f which has a minimum value of 0.02. It has long been thought (the so-called Chilton-Colburn relation) that $St/Pr^{1/3}$ could never be greater than f/2, as explained by the homology of the differential equation which controls the flow resistance (based on transfer of momentum) and the heat transfer to a flat surface. If we construct a heat exchanger of the type with thin wires with flat mats and ensure a high degree of accuracy of equidistance, it can be determined that $St \geq f$ and up to even $St=2*f$. It is moreover found that the St of a heat exchanger with fine wires is constant, even with an intense condensation of water vapour on the wires, this differing essentially from a fin heat exchanger which under the given conditions envelops itself naturally in a condensation layer which impedes the heat flow. For a reasonable operation of the heat exchanger this layer must be blown away at regular intervals. A condensation film cannot form around a thin wire. A series of very small droplets are formed instead, such as the dew on the threads of a spider's web. When the distance between the wires has the correct value, these droplets disappear quickly in the direction of the capillaries to which the wires are attached and are further displaced therefrom to the condensation discharge system. This very surprising and totally unexpected result, which has in the meantime been ascertained in practice in a greenhouse and confirmed by measurements, implies that the coefficient of heat transfer reaches a value of 500 $W/m^2K$, which must be compared with the corresponding value of only 25 $W/m^2K$ of a tube-fin heat exchanger.

Attention is now briefly paid to the heat transfer of water to copper. For practical and economic reason the capillaries to which the thin wires are attached have an outer diameter in the order of 2 mm and an inner diameter of 1 mm. In a warm and humid greenhouse with an economic air velocity of several meters per second in the heat exchanger, the necessary heat transfer between the cooling water and the inner wall of these capillaries, as well as the heat conduction along the thin wires, require a centre-to-centre distance between the capillaries in the order of only 4 to 6 mm. This makes waving of the wires unattractive, since a wave intersection will occur between each set of nearby capillaries. At this position the wires lie very closely to each other, this resulting in a low heat transfer to the flow-by air. It is therefore considerably more effective for the wires to extend in two groups parallel to each other on either side of the capillaries, whereby the intersections of a fabric are avoided.

A considerable part of the cost of a cooler for a greenhouse is for the medium-tight insertion of the thousands of capillaries in a sub-manifold for the purpose of connecting them to the medium flow, normally a water flow. For economic reasons each manifold can be embodied as an inexpensive polyethylene tube. An effective construction is specified in claim 11. PE is a very cheap and highly usable material. Some small leakage from a greenhouse to the atmosphere is not a problem; water is after all available in abundance.

It is a further advantage to choose the diameter of each sub-manifold, i.e. a manifold of one heat exchanger, so that it is the same as the desired centre-to-centre distance of the mats. The sub-manifolds lying tightly against each other can hereby together form the wall of the air duct.

It has been found very advantageous to make use of the difference in temperature between the ingoing and outgoing water necessary to store the heat underground, and also to realize a great difference in temperature of the inflowing and the outflowing air. This reduces the airflow and thereby the necessary fan capacity, improves the condensation by decreasing the air temperature below the dew point, and equalizes the difference in temperature between water and air over the whole heat exchanger.

This effect can be realized in accordance with claim 5 by blocking the water flow (in fact generally the medium flow) in the pipes of the sub-manifolds a total of three to five times on both sides of the mat in order to force the water flow in effective counter-flow relative to the airflow. The optimum number of theoretical units or $N_{TU}$ of the heat exchanger is about 1, and if the flow is blocked more than once the blocks can leak a little without reducing too much the effective $N_{TU}$. It is essential to block an odd number of times in order to realize two open ends on one sub-manifold and two closed ends on the other.

The centre-to-centre distance between the sub-manifolds equals the diameter of the sub-manifolds, and this has the result that it is not possible to connect all sub-manifolds to the same two main inlet and outlet manifolds. It is necessary to make use of four manifolds, i.e. two inlet manifolds and two outlet manifolds, such that there is space between the holes which mutually connect the ends of the sub-manifolds. The main manifolds can likewise be manufactured from a plastic, such as PE, with perforations having a smaller diameter than the outer diameter of the sub-manifolds, whereby these sub-manifolds can be pressed into these perforations. This is a very simple connection that has proven itself in drip irrigation technology.

Brief attention is now paid to the inhibition of corrosion. In countries with scarcity of water a greenhouse is often irrigated by means of the effluent from a water treatment plant for the waste water of a city. This effluent comprises volatile ammonia which corrodes the tin-covered wires. This corrosion is prevented when the airflow moves upward. The condensation flow always moves downward and in this case the condensation always keeps the foremost end of the heat exchanger in cleaned state, thereby preventing ammonia-catalyzed corrosion.

Several aspects of the application of the heat exchanger according to the invention in heat pump systems is now briefly discussed.

The "Coefficient of Performance" (COP) of a heat pump such as is used for air-conditioners and sometimes for space heating systems, is greatly dependent on the temperature drop over the heat exchangers of the evaporator and the condenser.

Heat exchangers known heretofore cannot be used directly for the media of condensing or evaporating heat pumps. Flat copper manifolds cannot withstand the occurring high pressures and for safety reasons the connections between the capillaries and the manifolds must therefore be realized by hard-soldering.

For pressures of more than 4 bar a metal manifold is required in the form of a round tube to which the capillaries are connected by hard-soldering at a temperature of for instance 500° C. This cannot be realized with capillaries of only 15 cm long, since there are simply too many ends requiring a hard-soldering operation. The flow of medium is considerably smaller than in the case of water with a difference in temperature between the inlet and outlet of several degrees Celsius, since the volume of latent heat or cold is so much greater. Even if the capillary is many meters long, the pressure drop in the two-phase medium still does not impede good operation of the heat exchanger.

On the basis of these long tubes curved in a zigzag it is not possible to use a weaving process to arrange the wires. The width of the weaving machine is not large enough and weaving of a long capillary back and forth to a weft of more than 1000 thin wires is technically impossible at this moment. It is therefore necessary to model the long capillary tube into a zigzag construction of mutually parallel, equidistantly placed capillaries in order to cover a space of for instance 15×15 cm with a centre-to-centre distance between the capillaries of for instance 12 mm, whereby a mat with only two end zones is realized instead of a mat with thirty end zones to which should be connected manifolds each having thirty perforations. These end zones are stripped of tin in anodic manner in an acid or base environment and then connected by hard-soldering to the relevant manifold.

The mat can then be connected by hard-soldering to the thin round copper tubes which carry the working medium to and from the compressor.

All air-conditioners operate to date with tube-fin heat exchangers. These have hard copper tubes of a large diameter. They would otherwise buckle under the compression forces necessary to press the aluminium fins onto the tubes. The evaporator and the condenser thus have a very considerable volume of working medium. For safety reasons this large quantity of working medium may not be flammable. Use is made for this reason of fluorinated and even chlorinated compounds which are however problematic due to environmental considerations. In a thin wire heat exchanger according to the invention there are no thick tubes and, due to the low volume, use can be made of propane or butane, and the total active volume of working medium can be reduced to minimal proportions, for instance the amount of a holder for filling lighters, which are commercially available everywhere and are so small they are deemed completely fireproof.

A mat of 15×15 cm² for instance which is only connected at its two thin ends is mechanically not sufficiently stable. All 180° bends between the adjacent capillaries must be fixed. For this purpose a rigid structure is used which holds the mat in its place.

Finally, brief reference is made to several aspects relating to district heating.

In cold, densely populated countries district heating is a very efficient method of heating space. The waste heat in electricity generation is herein used at the lowest possible temperature, wherein the houses or user stations act as condensers for the steam turbines. The return temperature of district heating networks nowadays is about 40 to 50° C. It would be very advantageous if it were possible to lower this temperature to for instance 25° C. It would then be possible to heat twice as many houses with the same water, and the steam pressure in the condenser would be lowers which increases the efficiency of electricity generation. These wishes can also be realized with a heat exchanger according to the present invention.

The feed temperature of the water of a district heating system is often 100° C. The return temperature can be designed at 25 to 27° C. The temperature difference therebetween is great enough to use very long capillaries and to give the heat exchanger the same form as those which can be used for direct connection to the evaporator or condenser of an air-conditioner.

Long tubes such as are applied in district heating are subject to pressure shocks. The heat exchanger according to the invention in the embodiment according to for instance claims 6 and 9 can withstand very high pressures.

Using the described construction the air can be heated to for instance 50° C. and the $N_{TU}$ can be designed for this requirement, whereby the airflow necessary to extract the necessary heat from the heat exchanger is very small and the fan can be very low-noise. With a view to compatibility with the available indoor space, the heat exchanger can be designed in a slender form, for instance 15 cm wide, 1 meter long and 15 cm high, and a slow-rotating, silent crossflow fan can be applied.

BRIEF DESCRIPTION OF THE DRAWINGS

FIG. 7 is a perspective view of a heat exchanger mat in which groups of capillaries are ordered in zigzag manner;

FIG. 7A shows in longitudinal section the detail of FIG. 7 indicated with an arrow;

FIG. 8 shows a view corresponding with FIG. 7 of a variant;

FIG. 8A shows in longitudinal section the detail of FIG. 8 indicated with an arrow;

DETAILED DESCRIPTION OF THE PREFERRED EMBODIMENTS

Figure 1:
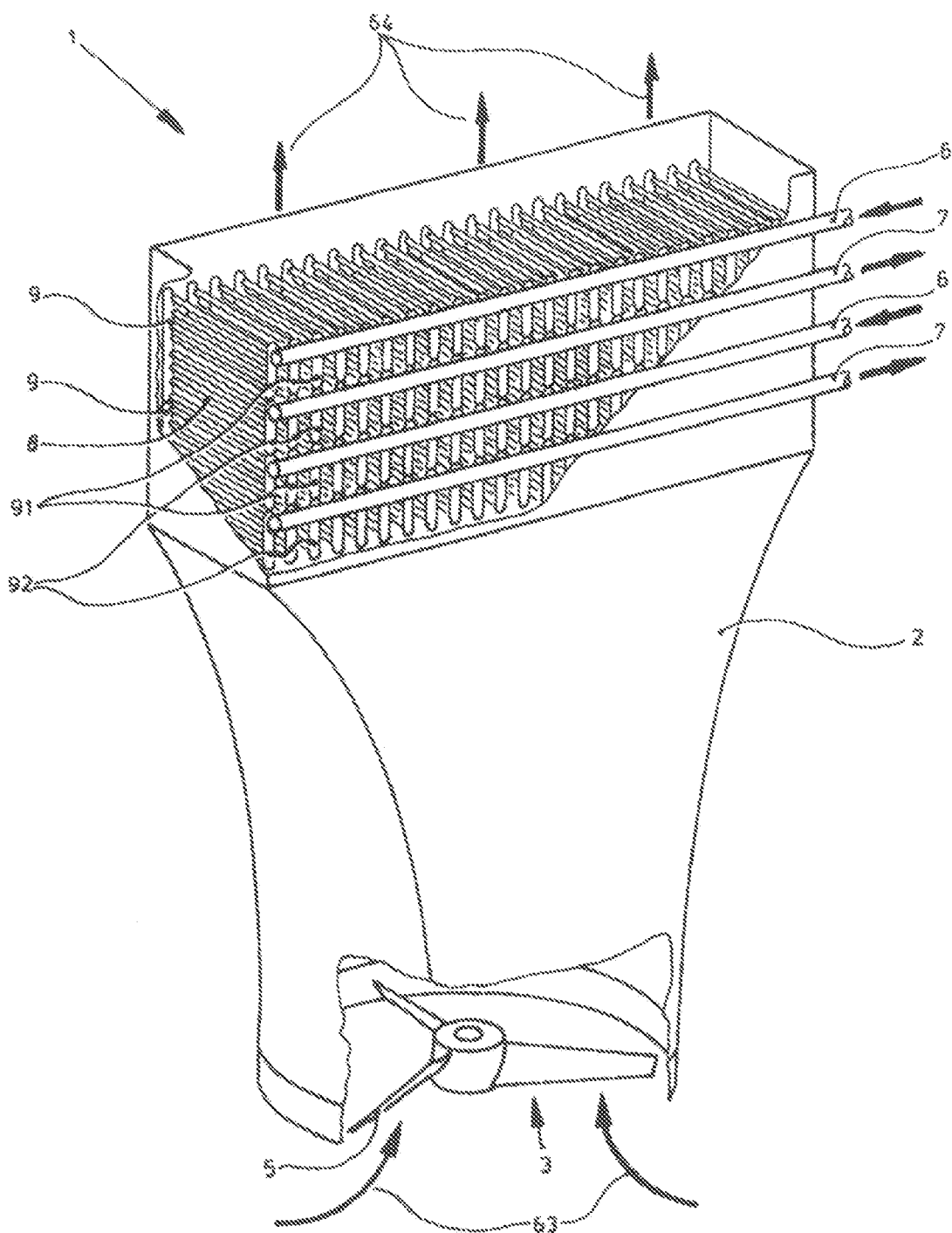
FIG. 1 shows a partly cut-away perspective view of a heat exchanger according to the invention.

FIG. 1 shows a heat exchanger 1 according to the invention. This heat exchanger 1 has a housing 2 with an air inlet 3 and an air outlet 4. An axial fan 5 is disposed in air inlet 3.

Figure 2:
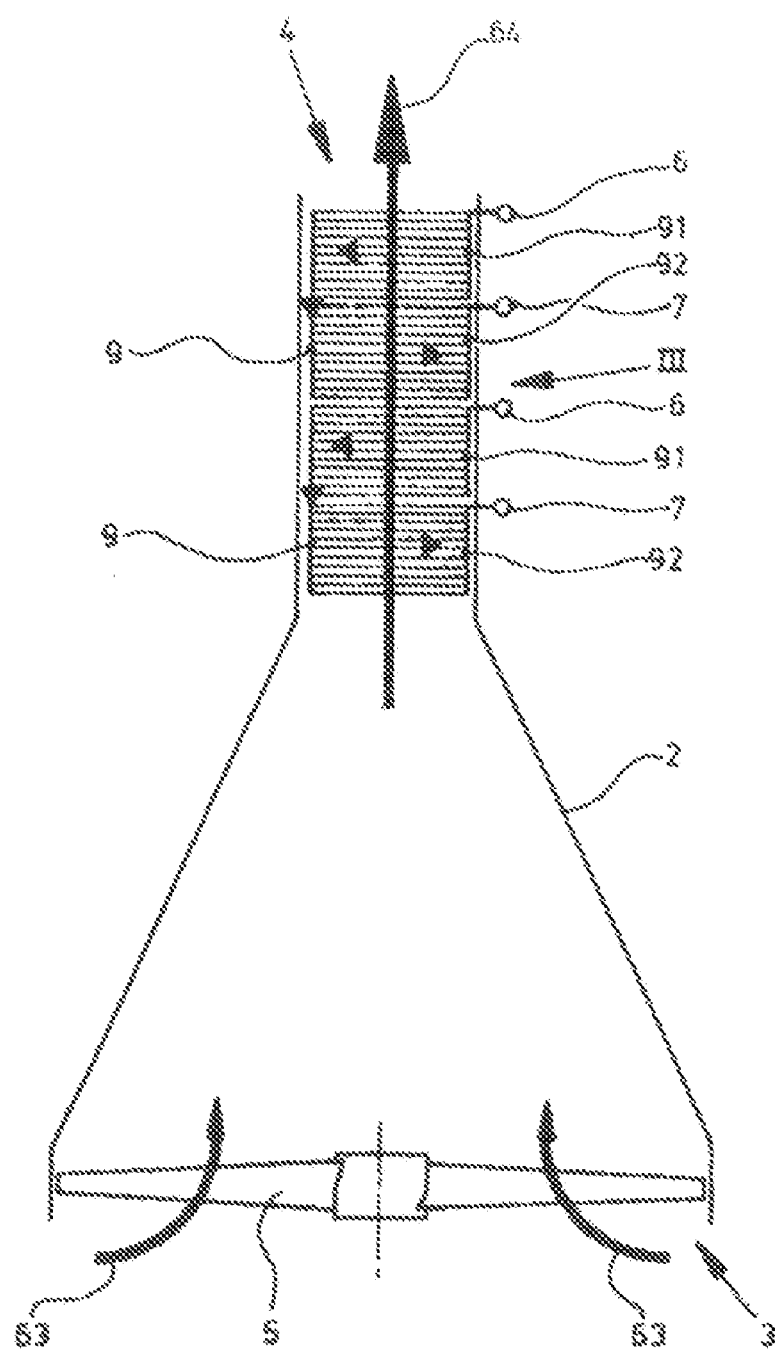
FIG. 2 shows a schematic cross-section through the heat exchanger of FIG. 1.

Two water inlet manifolds 6 and two water outlet manifolds 7 are present in housing 2. Manifolds 6 and 7 are connected via respective sub-manifolds 91, 92 to capillaries 8 disposed in groups in the manner of mats. Capillaries 8 which extend from inlet manifold 91 and to outlet manifold 92 are connected to an intermediate manifold 9 serving respectively as outlet manifold and inlet manifold. Reference is also made in this respect to FIG. 2. This figure also makes clear the manner in which the air 63 is blown by the axial fan 5 into housing 2 via gas inlet 3. The air flows along capillaries 8 and leaves housing 2 via gas outlet 4, see arrow 64. The water flowing through the capillaries is heated by the air 63, 64, and this air is in turn cooled by the water. It is noted that for the sake of clarity in FIGS. 1 and 2 the thin wires, which form an essential component of the heat exchanger according to the invention, are not drawn. Reference is made in this respect to the figures to be described below.

Figure 3:
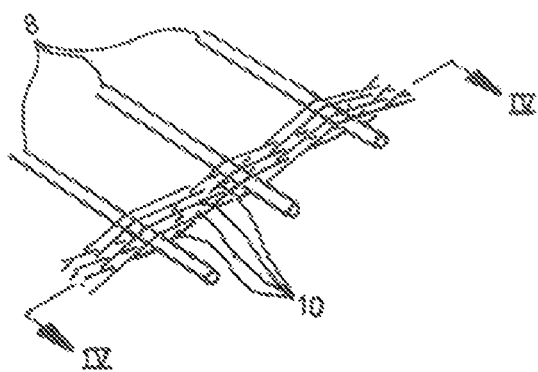
FIG. 3 is a perspective view of a detail of a heat exchanger mat in a first embodiment, wherein a number of wires are omitted for the sake of clarity.

FIG. 3 shows a part of a heat exchanger mat according to the invention. Capillaries 8 are ordered mutually parallel and equidistant with a centre-to-centre distance of about 12 mm. Thin wires 10 are placed interwoven with capillaries 8.

Figure 4:
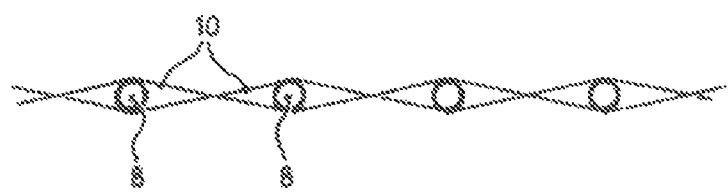
FIG. 4 shows the cross-section IV-IV of FIG. 3.

FIG. 4 clarifies the configuration. The centre-to-centre distance between adjacent, correspondingly placed wires 10 can be equal to or greater than the diameter of wires 10.

Figure 5:
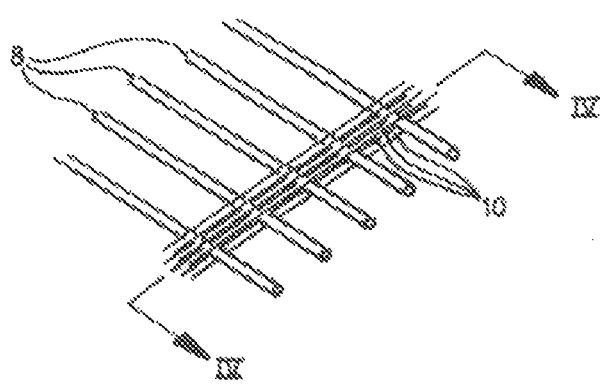
FIG. 5 is a perspective view corresponding with FIG. 3 of a variant.
Figure 6:
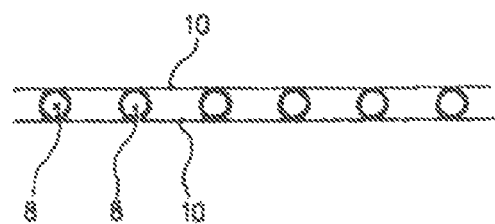
FIG. 6 shows the cross-section VI-VI of FIG. 5.

FIGS. 5 and 6 show an alternative in which wires 10 are not placed interwoven but are arranged in two groups and in mutually parallel relation on both sides of capillaries 8.

It will be apparent that a weaving operation is necessary in the configuration according to FIGS. 3 and 4. This is relatively slow and makes mass production of the heat exchanger problematic. Simpler to manufacture is the heat exchanger in the configuration according to FIGS. 5 and 6. It would appear at this moment that this is more suitable for mass production.

Capillaries 8 consist of copper and are provided on their outside with a tin layer. The wires are also of copper and provided with a tin layer. A soldering operation with local heating is therefore sufficient to realize in a short time an intensively metallic, heat-transferring contact between the capillaries and the wires.

It is important to note that the centre-to-centre distance between capillaries 8 in FIGS. 3, 4 must be greater than the centre-to-centre distance between capillaries 8 in FIGS. 5, 6. This is because the weaving operation for a construction as according to FIGS. 3 and 4 imposes a technically determined lower limit. This lower limit does not exist in the configuration of FIGS. 5 and 6. The heat exchanger based on FIGS. 5 and 6 can hereby be dimensioned more easily in accordance with selected design standards.

FIG. 7 shows that capillaries 8 are inserted into tin-plated copper tubes serving as manifolds. They are connected thereto by soft-soldering. Heat exchanger mat 21 as according to FIG. 7 comprises four sections 22, 23, 24, 25. An inlet manifold 26 is connected to five capillaries 8 in which medium flows in the direction of an arrow 127 to a manifold 27, which is also connected to a group of five capillaries 8 of section 23 in which the medium flow takes place as according to an arrow 128, so in opposed direction, to a manifold 29, then via five capillaries to a manifold 30 of section 24, from here to section 25 and five capillaries to an outlet manifold 31. The medium inlet is indicated with an arrow 32; the medium outlet is indicated with an arrow 33. The medium flows in the manifold tubes are also indicated with arrows. The airflow is designated with the reference numeral 64. The air flows on either side of mat 21 in longitudinal direction of wires 10.

FIG. 7A is an enlarged detail in cross-section which shows that there are interruptions between manifold tubes lying in one line. At the position of these interruptions the tubes in question are closed by plugs, generally designated with 34. Tubes 27 and 30 are also closed at the ends with such plugs.

FIG. 8 shows a functionally corresponding variant. The drawn heat exchanger mat 35 functions in the same manner as mat 21, but the manifold tubes 41 and 42 consist of polyethylene or other thermoplastic material with a low heat conduction. During the production process each of the tubes is cut open on one side in longitudinal direction, whereafter the ends of capillaries 8 are placed in the cuts and the material of the tube is then melted at that position by local heating such that in the manner shown in FIG. 8 capillaries 8 are connected substantially sealingly to both manifold tubes 41, 42. Instead of the interruptions and the plugs 34 in the embodiment according to FIG. 7A, a plug 43 is inserted locally as according to FIG. 8A. The ends of tube 41 are also closed by respective plugs.

Figure 9:
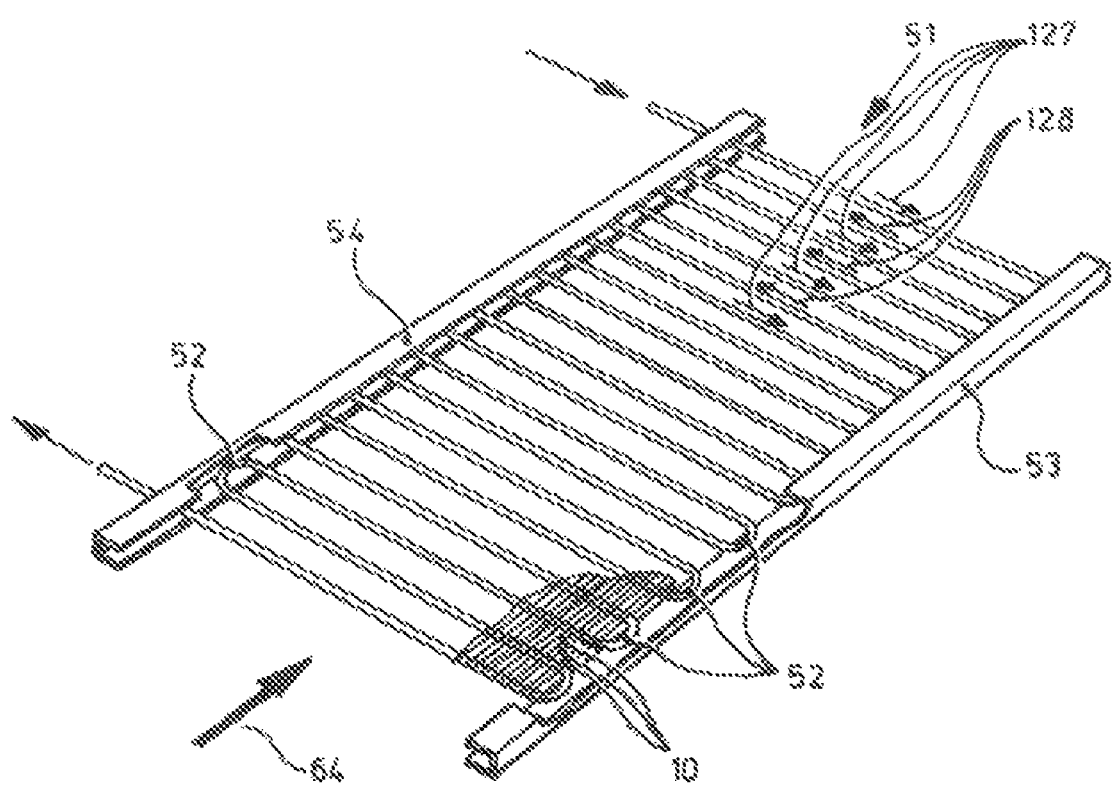
FIG. 9 shows a view corresponding with FIGS. 7 and 8 of a further embodiment.

FIG. 9 shows a heat exchanger mat 51 in an important alternative embodiment. In this embodiment capillaries 8 are formed from one capillary tube modelled into a zigzag shape, wherein each end of each capillary is connected via a U-shaped curved part 52 to the end of an adjacent capillary. These U-shaped curved parts of both sides of mat 51 are in register and connected mechanically to each other by means of respective strengthening profiles 53, 54 with a low heat conduction, for instance of plastic.

The inlet zone 101 and outlet zone 102 of the capillary tube forming capillaries 8 and the U-shaped parts 52 are connected in pressure-resistant manner by hard-soldering to respective manifolds (not drawn), to which further heat exchanger mats are also connected in the same manner.

Figure 10:
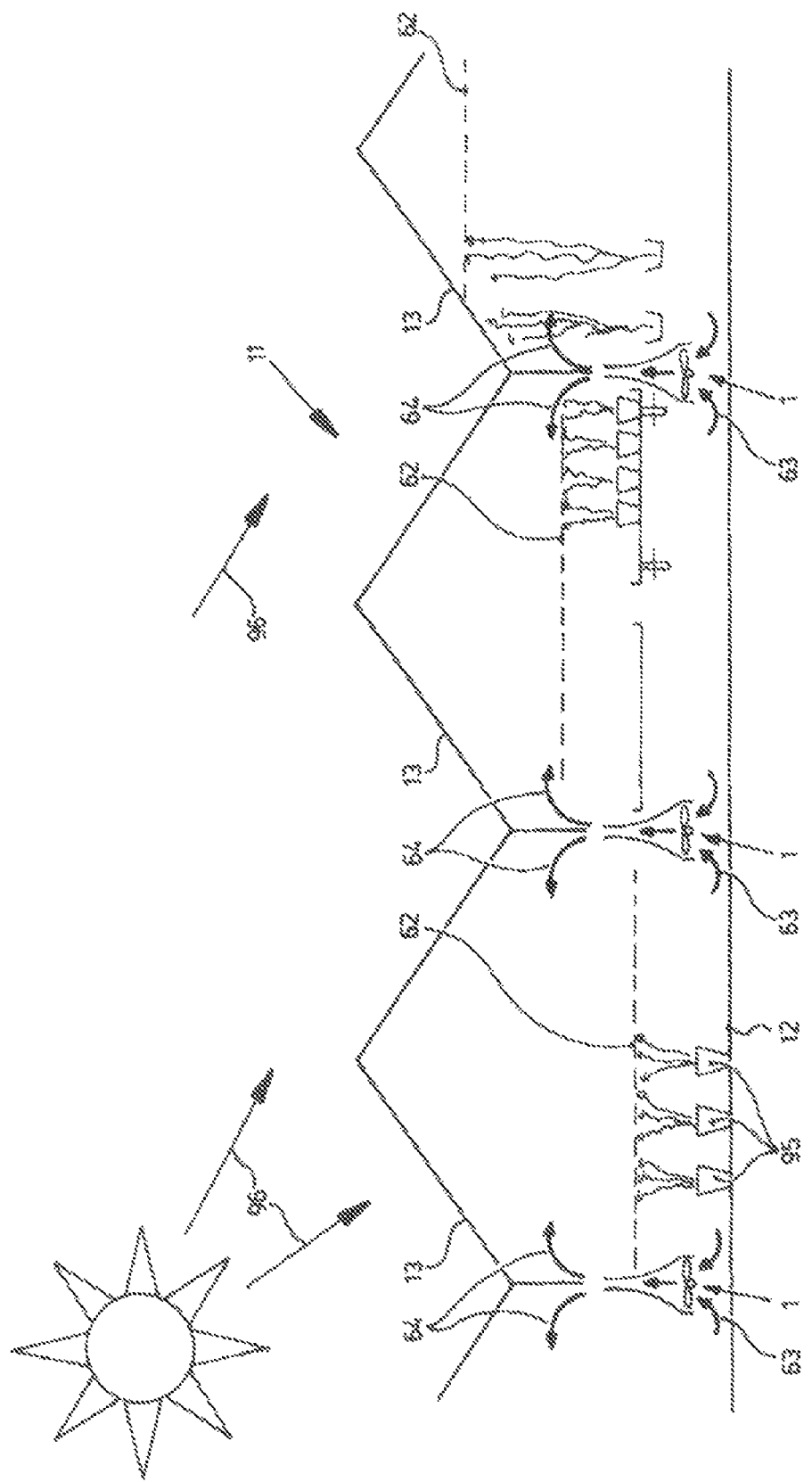
FIG. 10 is a schematic cross-section through a part of a greenhouse according to the invention.

FIG. 10 shows a greenhouse 11 with heat exchangers according to the invention. Greenhouse 11 has a floor 12 on which plants 95 stand in pots or are supported at a distance from floor 12 by for instance roller tables 61. Plants 95 define a leaf canopy which depends on the nature of the plant and the stage of its growth. The diverse leaf canopies are shown generally with broken lines, all marked 62 for the sake of convenience. It will be apparent that a leaf canopy cannot be defined within close limits and can display considerable height differences between plants, and even within one leaf canopy.

Greenhouse 11 has a translucent, preferably transparent roof 13 through which sunlight 96 can radiate onto leaf canopies 62. Heat exchangers 1 as according to FIG. 1 are disposed between plants 95. In this embodiment air 63 is drawn in from close to floor 12 with these heat exchangers 1, guided along the heat-exchanging mats (see FIGS. 1 and 2) and cooled or heated by the water flowing therethrough via the thin, vertically extending wires 10 along which the air flows in longitudinal direction. The air is then blown upward as according to arrows 64 to the upper part of glass house 11.

It is however also possible to use the heat exchanger without fan 5, i.e. by applying a chimney-like housing, one end of which extends into the upper part of glasshouse 11 and the other end of which is situated close to floor 12. With such a housing a natural draught can occur, thereby saving the energy for driving a fan 5.

Figure 11:
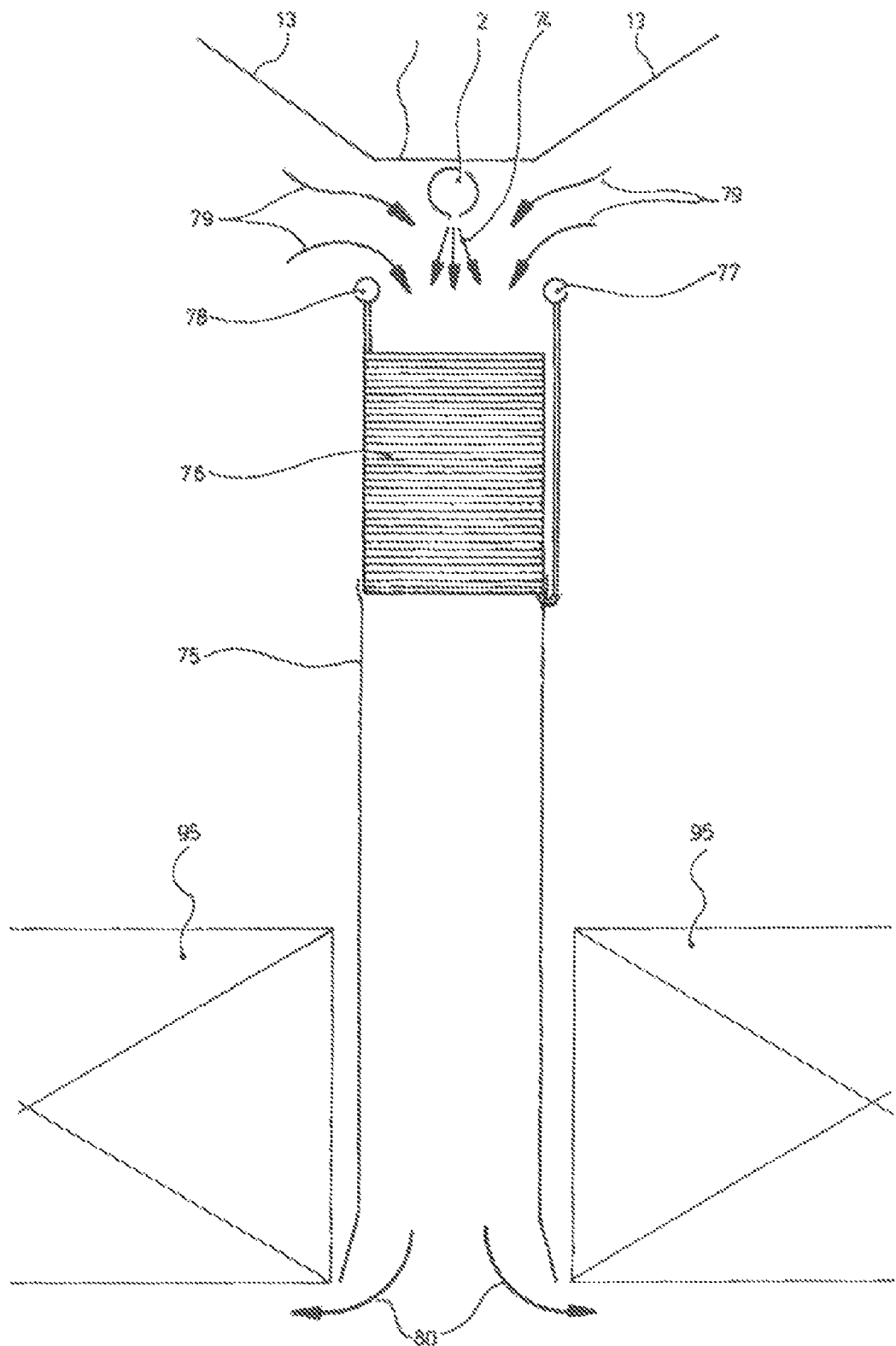
FIG. 11 is a schematic representation of application of a cooling system with a heat exchanger according to the invention.

FIG. 11 shows a detail of a greenhouse, wherein a gutter 71 is present at the position of a transition between the transparent roofs 13. A tube 72 consisting of foil and having a row of perforations 73 is positioned under this gutter. The tube is inflated by the exhaust gases from a gas turbine used for heat-power coupling. In a gas turbine these gases have only 4% $CO_2$, so there is much gas available which can have a pressure of 3600 Pa at the outlet of the turbine. This corresponds to an outflow speed of about 50 m/s. The air in question flows out of perforations 73 as according to arrows 74 and into a "reverse chimney" 75, in the top side of which is situated a heat exchanger 76 according to the invention. The construction thereof corresponds largely to that of the heat exchanger according to FIG. 7. Via a cooling water feed conduit 77 cooling water is admitted on the underside, heated and discharged as lukewarm water via a water outlet 78. The reverse chimney 75 consists for instance of a polyethylene foil.

Figure 12:
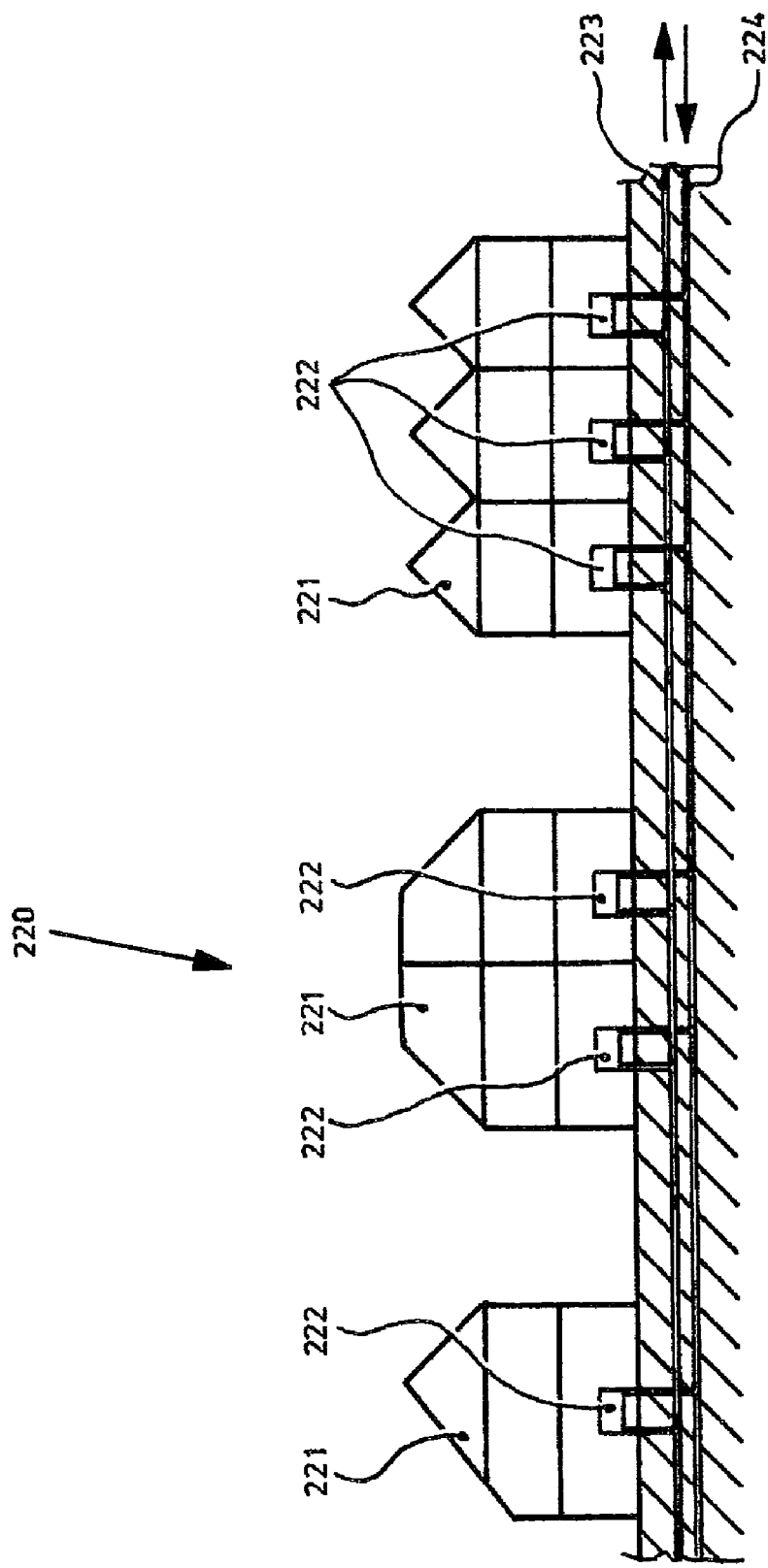
FIG. 12 is a schematic cross-section of a heating system.

FIG. 12 illustrates a heating system 220 with a plurality of users 221 each with a heat exchanger 222 connected to respective fluid lines 223, 224.

Due to the natural downward draught and the support thereof by the outflowing gases 74 there occurs an effective cooling of the hot air drawn in from the top side of the greenhouse, see arrows 79, and cooled air is blown out at the bottom as according to arrows 80.

The invention claimed is:
1. A heat exchanger, comprising:
a housing with a gas inlet and a gas outlet, for exchanging heat between at least one of a liquid-containing medium and a liquid-vapor mixture and a gas;
a medium inlet manifold;
a medium outlet manifold; and
an intermediate inlet manifold and an intermediate outlet manifold fluidly connected to the medium inlet manifold and the medium outlet manifold; and
at least one substantially flat heat exchanger mat fluidly connected to the medium inlet manifold and the medium outlet manifold, wherein the mat comprises:
a plurality of capillaries of heat-conducting material disposed in mutually parallel and mutually equidistant relation;
a plurality of wires of heat-conducting material, wherein the wires are attached in heat-conducting contact to the capillaries, extend in mutually equidistant relation in a transverse direction relative to the capillaries and have a mutual distance between each wire in the order of magnitude of the diameter of the wires; and
a drive means for causing gas flow from the gas inlet to the gas outlet, such that gas flows longitudinally along the wires and transverse to the capillaries for heat exchange between the gas and the medium flowing through the capillaries via the walls of the capillaries and the wires;
wherein the capillaries extend between the intermediate inlet manifold and the intermediate outlet manifold and wherein gas flows in a longitudinal direction of the wires along each mat and at least a substantial part of the gas is prevented from flowing through the mat.

2. The heat exchanger as claimed in claim 1, wherein the wires contact adjacent capillaries alternately on a first side and on a second side of the capillaries, wherein adjacent wires or groups of wires contact the opposite sides of the capillaries relative to nearby wires or groups of wires, such that the wires or groups of wires are mutually interwoven.

3. The heat exchanger as claimed in claim 1, wherein two groups of wires extend in two main planes in mutually parallel relation to each other, wherein the wires of each group contact the same side of the capillaries.

4. The heat exchanger as claimed in claim 1, wherein the intermediate inlet manifold has at least one of an interruption and a plug, the intermediate outlet manifold has at least one of an interruption and a plug offset relative to the intermediate inlet manifold such that the medium moves in a zigzag manner by moving through the capillaries connecting the intermediate inlet manifold and the intermediate outlet manifold and in the opposite direction in the capillaries connecting the intermediate outlet manifold to an adjacent section of the intermediate inlet manifold.

5. The heat exchanger as claimed in claim 1, wherein the capillaries are formed from one tube modeled into a zigzag shape, wherein each end of each capillary is connected via a U-shaped curved part to the end of a nearby capillary.

6. The heat exchanger as claimed in claim 5, wherein the U-shaped curved parts of both sides of the at least one substantially flat heat exchanger mat are in register and coupled mechanically to each other by means of a strengthening profile with a low heat conduction.

7. The heat exchanger as claimed in claim 6, wherein the heat exchanger comprises a plurality of heat exchanger mats held by spacers in a mutually parallel and an equidistant relation, and wherein the spacers are the strengthening profiles.

8. The heat exchanger as claimed in claim 1, wherein each of the intermediate inlet manifold and the intermediate outlet manifold is a tube having a row of perforations and wherein the ends of the capillaries are sealingly inserted into the perforations.

9. The heat exchanger as claimed in claim 1, wherein each of the intermediate inlet manifold and the intermediate outlet manifold is a tube of thermoplastic material, the tube having a cut in a longitudinal direction on one side, whereafter the ends of the capillaries are placed in the cut and the material of the tube is then melted at that position by local heating such that the capillaries are connected substantially sealingly to the tube.

10. The heat exchanger as claimed in claim 9, wherein a main flow direction of the medium in the medium inlet manifold and the medium outlet manifold is generally transverse to a gas flow direction.

11. The heat exchanger as claimed in claim 1, wherein the heat exchanger comprises a plurality of heat exchanger mats held by spacers in a mutually parallel and an equidistant relation.

12. The heat exchanger as claimed in claim 11, wherein the spacers are the intermediate inlet manifold and the intermediate outlet manifold.

13. The heat exchanger as claimed in claim 1, wherein the drive means comprises a fan.

14. The heat exchanger as claimed in claim 1, wherein the housing is shaped as a chimney such that gas flow occurs by natural convection.

15. A greenhouse, comprising:
a ground surface;
plants supported by the ground surface by support means and forming a leaf canopy; and
heating and cooling means with at least one heat exchanger comprising:
  a housing with a gas inlet and a gas outlet, for exchanging heat between at least one of a liquid-containing medium and a liquid-vapor mixture and a gas;
  a medium inlet manifold;
  a medium outlet manifold;
  an intermediate inlet manifold and an intermediate outlet manifold fluidly connected to the medium inlet manifold and the medium outlet manifold; and
  at least one substantially flat heat exchanger mat fluidly connected to the medium inlet manifold and the medium outlet manifold, wherein the mat comprises:
    a plurality of capillaries of heat-conducting material disposed in mutually parallel and mutually equidistant relation;
    a plurality of wires of heat-conducting material, wherein the wires are attached in heat-conducting contact to the capillaries, extend in mutually equidistant relation in a transverse direction relative to the capillaries and have a mutual distance between each wire in the order of magnitude of the diameter of the wires; and
  a drive means for causing gas flow from the gas inlet to the gas outlet, such that gas flows longitudinally along the wires and transverse to the capillaries for heat exchange between the gas and the medium flowing through the capillaries via the walls of the capillaries and the wires;
wherein the capillaries extend between the intermediate inlet manifold and the intermediate outlet manifold,
wherein gas flows in a longitudinal direction of the wires along each mat and at least a substantial part of the gas is prevented from flowing through the mat, and
wherein one of the gas inlet and the gas outlet is situated above the level of the leaf canopy and the other is situated below the level of the leaf canopy, or both are situated in the leaf canopy.

16. The greenhouse as claimed in claim 15, further comprising a heat storage for temporarily storing surplus heat.

17. The greenhouse as claimed in claim 15, wherein the heating and cooling means are adapted for connection to an aquifer.

18. A city heating system, comprising:
a plurality of heat exchangers installed with a plurality of users, the heat exchangers each comprising:
  a housing with a gas inlet and a gas outlet, for exchanging heat between at least one of a liquid-containing medium and a liquid-vapor mixture and a gas;
  a medium inlet manifold;
  a medium outlet manifold;
  an intermediate inlet manifold and an intermediate outlet manifold fluidly connected to the medium inlet manifold and the medium outlet manifold; and
  at least one substantially flat heat exchanger mat fluidly connected to the medium inlet manifold and the medium outlet manifold, wherein the mat comprises:
    a plurality of capillaries of heat-conducting material disposed in mutually parallel and mutually equidistant relation;
    a plurality of wires of heat-conducting material, wherein the wires are attached in heat-conducting contact to the capillaries, extend in mutually equidistant relation in a transverse direction relative to the capillaries and have a mutual distance between each wire in the order of magnitude of the diameter of the wires; and
  a drive means, for causing gas flow from the gas inlet to the gas outlet, such that gas flows longitudinally along the wires and transverse to the capillaries for heat exchange between the gas and the medium flowing through the capillaries via the walls of the capillaries and the wires;
wherein the capillaries extend between the intermediate inlet manifold and the intermediate outlet manifold and wherein gas flows in a longitudinal direction of the wires along each mat and at least a substantial part of the gas is prevented from flowing through the mat.

* * * * *